(12) United States Patent
Schuster (10) Patent No.: US 11,275,935 B2
(45) Date of Patent: Mar. 15, 2022

(54) PATENT ANALYSIS APPLICATIONS AND CORRESPONDING USER INTERFACE FEATURES

(71) Applicant: Michael J. Schuster, Shorewood, IL (US)

(72) Inventor: Michael J. Schuster, Shorewood, IL (US)

(73) Assignee: Michael J. Schuster, Shorewood, IL (US)

( * ) Notice: Subject to any disclaimer, the term of this patent is extended or adjusted under 35 U.S.C. 154(b) by 0 days.

(21) Appl. No.: 16/389,194

(22) Filed: Apr. 19, 2019

(65) Prior Publication Data
US 2019/0325214 A1    Oct. 24, 2019

Related U.S. Application Data (60) Provisional application No. 62/660,948, filed on Apr. 21, 2018.

(51) Int. Cl.
*G06K 9/00* (2006.01)
*G06K 9/34* (2006.01)
(Continued)

(52) U.S. Cl.
CPC ......... *G06K 9/00476* (2013.01); *G06F 17/00* (2013.01); *G06K 9/00442* (2013.01);
(Continued)

(58) Field of Classification Search
CPC ........... G06K 9/00442; G06K 9/00456; G06K 9/00463; G06K 9/00469; G06K 9/00476;
(Continued)

(56) References Cited

U.S. PATENT DOCUMENTS

| | | | |
|---|---|---|---|
| 2005/0216828 A1* | 9/2005 | Brindisi | G06F 17/241 715/201 |
| 2009/0228777 A1* | 9/2009 | Henry | G06F 16/40 715/230 |

(Continued)

*Primary Examiner* — Vincent Rudolph
*Assistant Examiner* — Timothy Choi
(74) *Attorney, Agent, or Firm* — Thomas | Horstemeyer, LLP (57) ABSTRACT

Disclosed are various embodiments for patent analysis applications. A computing device may be directed to parse an electronic version of a patent document having a detailed description, a claims section, and at least one drawing. In various embodiments, parsing the electronic version of the patent document may include applying an OCR process to the electronic document, obtaining a list of claim terms used in the claims section, identifying instances of the claim terms used in the detailed description, identifying a reference numeral corresponding to the claim terms from the detailed description, and identifying portions of the drawing that includes the reference numeral. In response to user interaction with a claim term, a dialog may be shown proximate to the claim term, where the dialog includes a portion of the detailed description that includes the claim term and/or the drawing that comprises the reference numeral corresponding to the claim term.

20 Claims, 7 Drawing Sheets

(51) Int. Cl.
  *G06T 17/10* (2006.01)
  *G06F 17/00* (2019.01)
  *G06T 19/00* (2011.01)

(52) U.S. Cl.
  CPC .............. *G06K 9/344* (2013.01); *G06T 17/10* (2013.01); *G06K 2209/01* (2013.01); *G06T 19/006* (2013.01)

(58) Field of Classification Search
  CPC .. G06K 9/344; G06K 2209/01; G06T 19/006; G06F 17/00; G06F 17/20; G06F 17/21; G06F 17/211; G06F 17/212; G06F 17/218; G06F 40/10; G06F 40/103; G06F 40/106; G06F 40/117; G06F 40/166; G06F 40/169; G06F 40/205
  See application file for complete search history.

(56) References Cited

U.S. PATENT DOCUMENTS

| | | | |
|---|---|---|---|
| 2011/0167350 A1* | 7/2011 | Hoellwarth | G06F 16/34 715/727 |
| 2013/0262968 A1* | 10/2013 | Gartman | G06Q 50/184 715/202 |
| 2014/0040734 A1* | 2/2014 | Li | G06F 17/212 715/273 |
| 2014/0200880 A1* | 7/2014 | Neustel | G06F 17/2765 704/9 |
| 2015/0347366 A1* | 12/2015 | Irwin | G06F 17/241 715/231 |

* cited by examiner

Patent Analyzer – Web Browser

File   Edit   View   Bookmarks   Tools   Help http://www.patentanalysis.site/patent/E123456

AlphaCo | Sign Out

Pat. No. E123,456

Search

Bicycle with Bearing

FIG. 1    FIG. 2

"bicycle"
Embodiments for a bicycle (10) are disclosed, where the bicycle (10) comprises a...

—212

Embodiments for a bicycle (10) are disclosed, where the bicycle (10) comprises a frame (15), a first pedal (20), a second pedal (25), a handle bar (30), ...

1. A bicycle, comprising:
   a frame;
   a first pedal;
   a second pedal;
   a handle bar;
   ...

Patent Analyzer – Web Browser

File   Edit   View   Bookmarks   Tools   Help http://www.patentanalysis.site/patent/E123456

AlphaCo | Sign Out

Pat. No. E123,456

Bicycle with Bearing

"handle bar"
...the bicycle (10) comprises a frame (15), a first pedal (20), a second pedal (25), a handle bar (30),...

—212

Embodiments for a bicycle (10) are disclosed, where the bicycle (10) comprises a frame (15), a first pedal (20), a second pedal (25), a handle bar (30), ...

1. A bicycle, comprising:
   a frame;
   a first pedal;
   a second pedal;
   a handle bar;
   ...

PATENT ANALYSIS APPLICATIONS AND CORRESPONDING USER INTERFACE FEATURES

CROSS-REFERENCE TO RELATED APPLICATION

This application claims the benefit of and priority to U.S. Provisional Patent Application No. 62/660,948, entitled "PATENT ANALYSIS APPLICATIONS AND CORRESPONDING USER INTERFACE FEATURES," filed Apr. 21, 2018, the contents of which being incorporated by reference in their entirety herein.

BACKGROUND

Various websites and applications exist for browsing and looking at patent publications and issued patents. Patents and patent publications are generally provided to the public as portable document format (PDF) or tagged image file format (TIFF) documents. As the claims of the patent define its scope of protection, one having to analyze a patent must repeatedly glance between a claim term, drawings, and a corresponding description of the claim term to understand the use of the claim term.

BRIEF SUMMARY OF THE INVENTION

According to various embodiments, a system may include, for example, at least one computing device comprising at least one hardware processor. The system may further include program instructions stored in memory and executable in the at least one computing device that, when executed, direct the at least one computing device to parse an electronic version of a patent document comprising at least (a) a detailed description, (b) a claims section, and (c) at least one drawing. In various embodiments, parsing the electronic version of the patent document may include applying an optical character recognition process to the electronic document, obtaining a list of claim terms used in the claims section, identifying instances of the claim terms used in the detailed description, identifying at least one reference numeral corresponding to the claim terms from the detailed description, and identifying portions of the at least one drawing that comprises the at least one reference numeral.

Further, the at least one computing device may be directed to generate at least one user interface that comprises a textual reproduction of at least a portion of the claims section as well as to identify a user interaction with a claim term in the portion of the claims section in the at least one user interface. In response to the user interaction with the claim term, the at least one computing device may cause a dialog to be presented proximate to the claim term, wherein the dialog comprises at least a portion of the detailed description that includes the claim term and/or the at least one drawing that comprises the at least one reference numeral corresponding to the claim term. The user interaction may include, for example, a hover-over event being performed in association with the claim term or a selection event being performed in association with the claim term.

In additional embodiments, the at least one computing device may be directed to generate a three-dimensional model of an object corresponding to the claim term using the at least one drawing, where the at least one drawing comprises a two-dimensional black-and-white line drawing. The three-dimensional model may be shown in the dialog of the at least one user interface or used as an augmented feature in an augmented reality (AR) session. Further, in some embodiments, the at least one computing device may be directed to, in response to the user interaction with the claim term, apply a color to a portion of the at least one drawing that corresponds to the claim term and/or apply a color to the instances of the claim term in the detailed description. Searching the web for pages containing virtual patent information.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present application relates to patent analysis applications and corresponding user interface features, as will be described. As noted above, various websites and applications exist for browsing and looking at patent publications and issued patents. Patents and patent publications are generally provided to the public as PDF or TIFF documents. As the claims of the patent define its scope of protection, one having to analyze a patent must repeatedly glance between a claim term, drawings, and a corresponding description of the claim term to understand the use of the claim term.

As such, the present disclosure relates to client- and server-side applications that reduce time in reviewing patent documents, such as issued patents and patent publications. These applications may simplify the process of evaluating patents by having all the information on a single page or user interface, as opposed to flipping between claims, description and drawings. Accordingly, in various embodiments, a computing device, such as a server, may be directed to parse an electronic version of a patent document comprising at least (a) a detailed description, (b) a claims section, and (c) at least one drawing. In various embodiments, parsing the electronic version of the patent document may include applying an optical character recognition process to the electronic document, obtaining a list of claim terms used in the claims section, identifying instances of the claim terms used in the detailed description, identifying at least one reference numeral corresponding to the claim terms from the detailed description, and identifying portions of the at least one drawing that comprises the at least one reference numeral.

Further, the computing device may be directed to generate at least one user interface for presentation on a client device. The user interface may include, for example, a textual reproduction of at least a portion of the claims section as well as other portions of a patent document. The computing device may identify a user interaction with a claim term in the portion of the claims section in the at least one user interface. In response to the user interaction with the claim term, the computing device may cause a dialog to be presented proximate to the claim term, wherein the dialog comprises at least a portion of the detailed description that includes the claim term and/or the at least one drawing that comprises the at least one reference numeral corresponding to the claim term. The user interaction may include, for example, a hover-over event being performed in association with the claim term or a selection event being performed in association with the claim term.

In additional embodiments, the at least one computing device may be directed to generate a three-dimensional model of an object corresponding to the claim term using the at least one drawing, where the at least one drawing comprises a two-dimensional black-and-white line drawing. The three-dimensional model may be shown in the dialog of the at least one user interface or used as an augmented feature in an augmented reality (AR) session. In this regard, the three-dimensional model may be imposed as a virtual artifact in a video feed. Further, in some embodiments, the at least one computing device may be directed to, in response to the user interaction with the claim term, apply a color to a portion of the at least one drawing that corresponds to the claim term and/or apply a color to the instances of the claim term in the detailed description. Artificial intelligence may be used along with drawings and the detailed description (that describes each of the features). Thus, the artificial intelligence may use the detailed description and the drawings to generate a three-dimensional model. In the following discussion, a general description of the system and its components is provided, followed by a discussion of the operation of the same.

Figure 1:
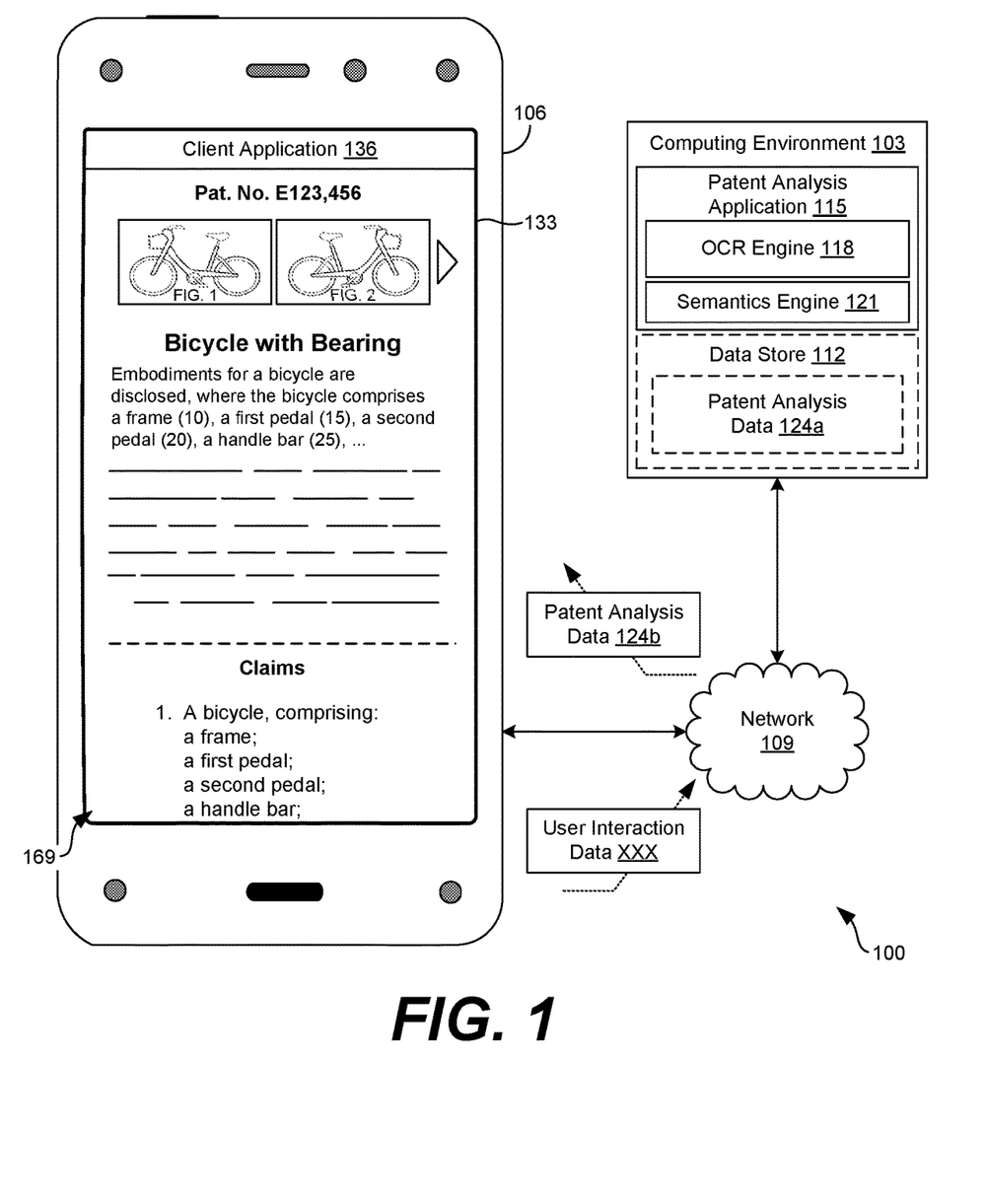
FIG. 1 is a drawing of a networked environment according to various embodiments of the present disclosure.

With reference to FIG. 1, shown is a networked environment 100 according to various embodiments. The networked environment 100 includes a computing environment 103, and a client device 106, which are in data communication with each other via a network 109. The network 109 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include a patent analysis application 115, an optical character recognition (OCR) engine 118, a semantics engine 121, and other applications, services, processes, systems, engines, or functionality not discussed in detail herein. The patent analysis application 115 is executed to analyze patent documents and raw data provided publicly by the Patent Trademark Office such as API's, USPTO Open Data Portal, PTAB RESTful or E2E, Bulk Data Storage System (BDSS), Patent Examination Data System, Open Data Portal, PTAB API, Research Data Sets, Global Dossier, Assignments Data, Data Visualization, Patent Technology Monitoring Team (PTMT), Patent Statistics Reports and Data Products and other products provided by the PTO and partners (like Reed Tech) and other patent documents and information made public. The patent analysis application 115 can utilize the OCR engine 118 to extract words, characters, symbols, and other information from the electronic documents for analysis. Further, the patent analysis application 115 can identify nouns, verbs, or other semantics from the electronic document using the semantics engine 118. As such, the semantics engine 118 may be employed to identify claim terms (e.g., nouns) from the claims sections of the electronic document and identify corresponding claim terms in the detailed description and/or drawings.

The data stored in the data store 112 includes, for example, patent analysis data 124a, 124b, and potentially other data. The client device 106 is representative of a plurality of client devices that may be coupled to the network 109. The client device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smart glasses or other devices with like capability. The client device 106 may include a display 133. The display 133 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, lens of smart glasses etc.

The client device 106 may be configured to execute various applications such as a client application 136 and/or other applications. The client application 136 may be executed in a client device 106, for example, to access network content served up by the computing environment 103 and/or other servers, thereby rendering a user interface 169 on the display 133. To this end, the client application 136 may comprise, for example, a browser, a dedicated application, etc., and the user interface 169 may comprise a network page, an application screen, etc. The client device 106 may be configured to execute applications beyond the client application 136 such as, for example, email applications, social networking applications, word processors, spreadsheets, and/or other applications.

Figure 2A:
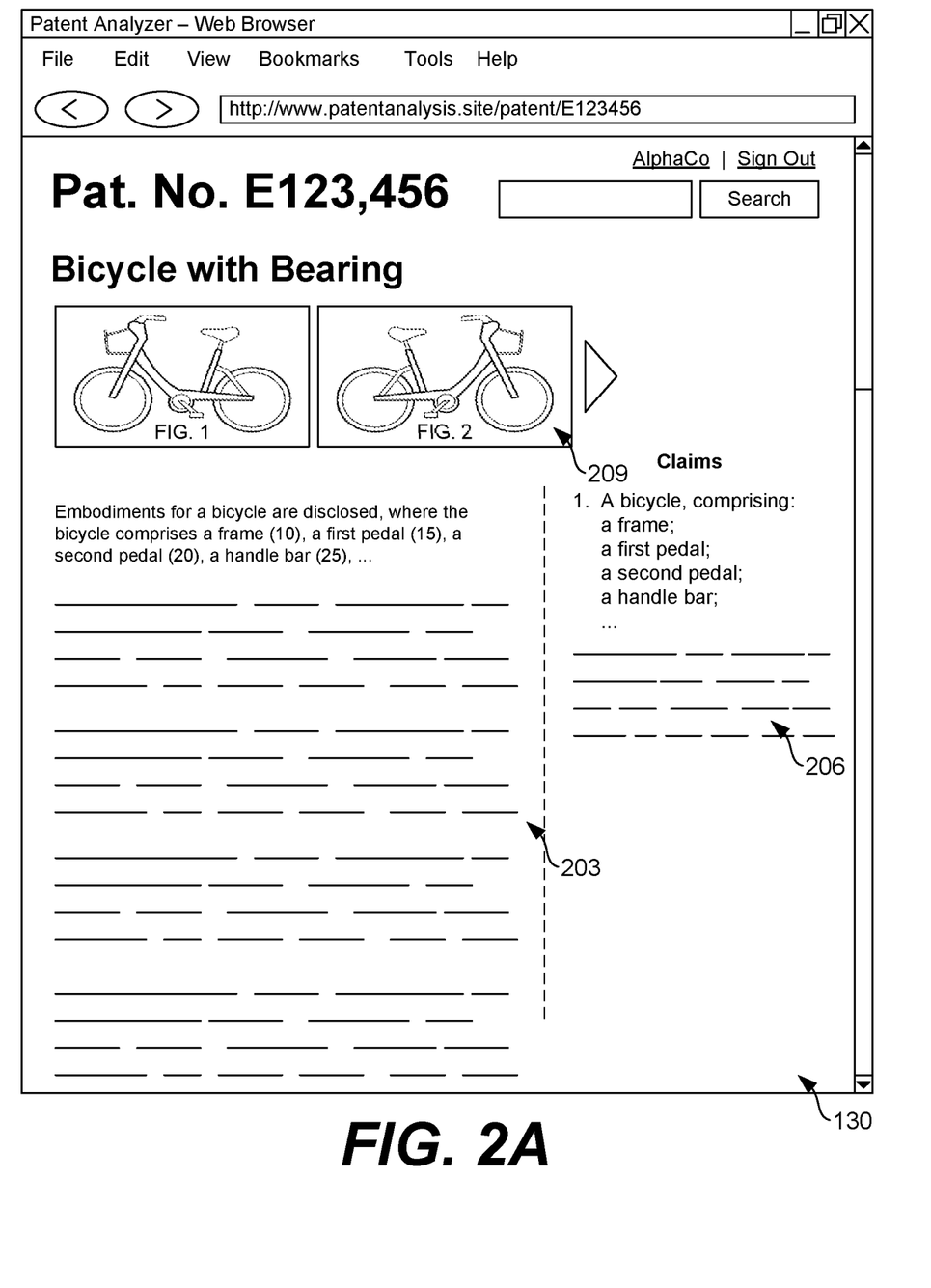
FIGS. 2A-2E are pictorial diagram of an example user interface rendered by a client device in the networked environment of FIG. 1 according to various embodiments of the present disclosure.

Referring next to FIG. 2A, shown is a non-limiting example of a user interface 169 that may be generated by the computing environment 103. As noted above, a patent document (not shown) may include a detailed description, a claims section, and at least one drawing. As such, the user interface 169 may include data parsed from the patent document. For instance, text extracted from the patent document may be shown in the user interface 169 as a detailed description 203 and a claim section 206. Additionally, drawings may be extracted from the patent document and reproduced in the user interface 169 as a drawings section 209, allowing an end user to navigate between drawings.

In some embodiments, the patent analysis application 115 may identify key drawing numbers that are associated with a claim to appear in the dialog 212, for instance, to visually connect a drawing to the claims (and/or a detailed description of a claim term). Additionally this connects the drawings to the detailed description or the detailed description to the drawings. (e.g. the detailed description calls out the FIG. 2 #101 and could show an exploded view of this particular area 101. Also as you look at the drawings you could click on the fig number and see the detailed description that describes #101).

As drawings included in a patent document are two-dimensional, it can be difficult to understand the different perspectives without evaluating all drawings and detailed descriptions. In some embodiments, additional and different perspectives of the drawings and or detailed description can be used by the patent analysis application 115 to produce three-dimensional models and/or images that can be manipulated by an end user, for instance, to better understand the claims. Conversion may be performed using known 2D-to-3D image conversion algorithms, such as those described in (i) C. C. Cheng, C. T. Li, L. G. Chen, "A novel 2D-to-3D conversion system using edge information", IEEE Trans. Consumer Electron., vol. 56, no. 3, pp. 1739-1745, August 2010, (ii) C. C. Cheng, C. T. Li, L. G. Chen, "A novel 2D-to-3D conversion system using edge information", IEEE Trans. Consumer Electron., vol. 56, no. 3, pp. 1739-1745, August 2010, and (iii) L. J. Angot, W. J. Huang, K.-C. Liu, "A 2D to 3D video and image conversion technique based on a bilateral filter", Proc. SPIE 7526 Three-Dimensional Image Processing (3DIP) and Applications 75260D, vol. 7526, pp. 75260D, February 2010. Moreover, it can be difficult to apply a monetary value to a patent. Providing a connection between patent number and the virtual patent marking (via web pages) can increase the accuracy if the patent is actually in use on a marketable product. For instance, the computing device may be used to compare the number of products a company has in the market to determine the company's level of innovation or provide a ratio between number of company patents to the number of patented products in the market. Additionally, a search application may be employed to search the Internet or other network for companies with patents or patent applications listed using the approved virtual patent listing format. As such, patent valuations may be performed as well as comparing the number of products a company has in the market to determine the company's level of innovation or provide a ratio between number of company patents to the number of patented products in the market.

Figure 2B:
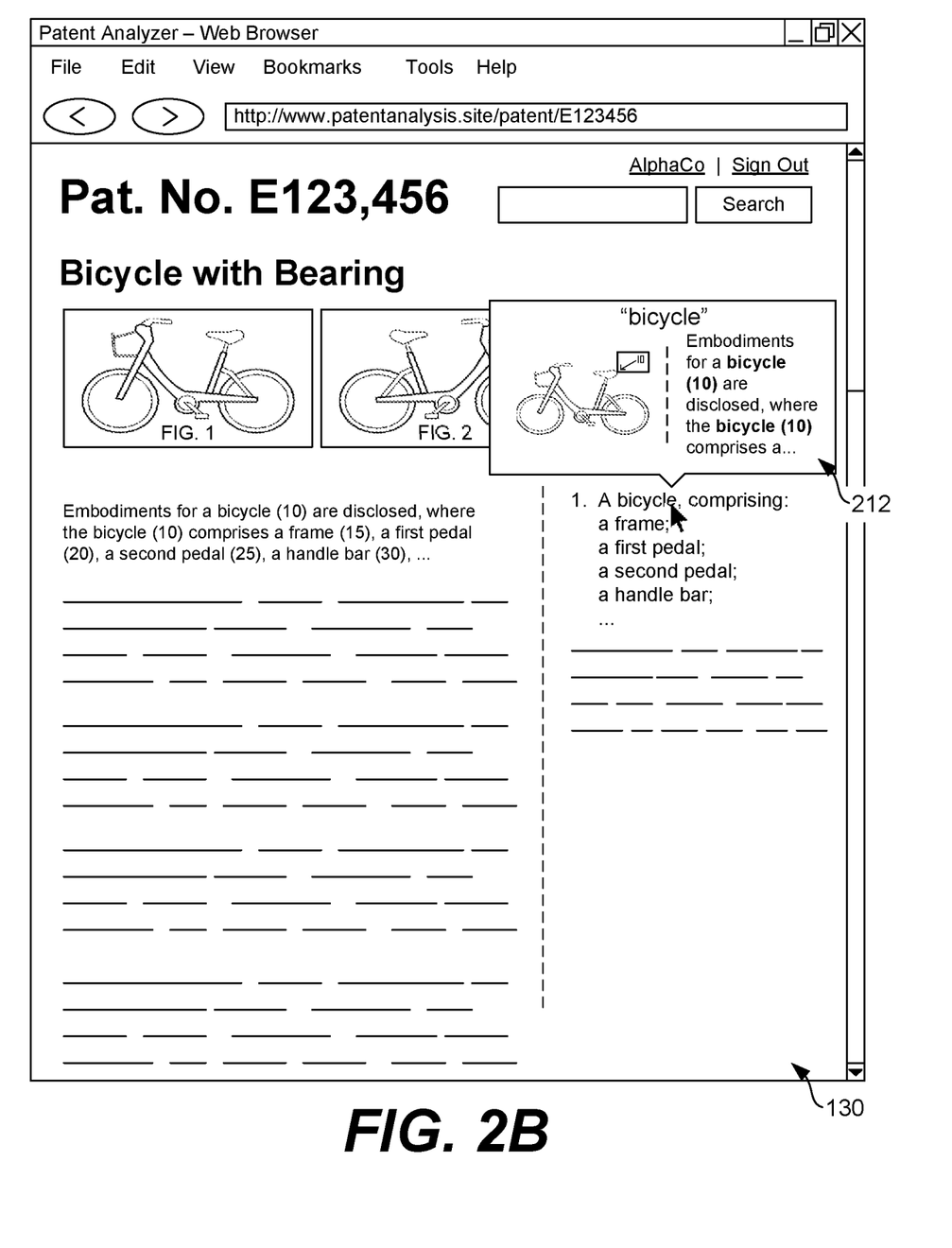

Turning now to FIG. 2B, shown is another non-limiting example of the user interface 169 that may be generated by the computing environment 103. Specifically, FIG. 2B shows a user interaction with a claim term, such as "bicycle." A dialog 212 is shown in the user interface 169 that includes additional information corresponding to the selected or manipulated claim term. For instance, the dialog 212 may include a portion of the detailed description that introduced the claim term, defines the claim term, or other suitable portion that used the claim term. Moreover, a drawing that includes a reference numeral corresponding to the claim term may be included in the dialog 212. In some embodiments, the reference numeral may be emphasized by modifying the reference numeral text (e.g., using highlighting, applying a background color, etc.). In additional embodiments, a corresponding part in the drawing may be emphasized by modifying the corresponding part (e.g., by coloring the corresponding part, applying a highlighting to a region that includes the corresponding part, etc.). Can also use highlighted, bold or larger font.

Similarly, the converse may apply if terms of the specification are selected or otherwise manipulated (e.g., the corresponding claim term may be highlighted or shown in a dialog 212). This may apply if key words were highlighted and clicked or highlighted with more description in a side window (e.g., on the same user interface 169).

The patent analysis application 115 may also determine and emphasize key elements in a claim. For example, the term "distal end" in a claim may be emphasized as well as its use in the detailed description (or other areas of the electronic document). For instance, while in the claims, when an end user hovers or click on a claim term, the dialog 212 may be shown (or other similar user interface feature, such as a side window). For example it would describe the "distal end" in more detail and include a corresponding figure and/or reference numeral. Hovering or clicking on the reference number would show (in a balloon or side window) as well as (possibly) highlighting a close-up view of the drawing focusing on the number and area referenced (e.g., "Distal End 342" FIG. 3A).

Additionally, the patent analysis application 115 may show independent claims differently (e.g. in a different color, text or other visual difference) than dependent claims. The key words in the dependent claims could be grouped with the independent claims they depend on, thereby allowing an end user to visualize a more clear scope of coverage. For example dependent claim 10 could depend on claim 9 and independent claim 1. The text could be physically be brought together (e.g., 1, 9, and 10) or grayed-out (e.g., claims 2-9 shown in gray as the end user reviews dependent claim 10). This process would also work from the detailed description (e.g., highlighting a common key word used in the claims). This could show a dialog 212, balloon, or side window as to where this showed up in the claims as well as (possibly) highlighting a close up view of the drawing and/or reference numeral. Lastly, this could also be useful from the drawings to highlight claimed areas with a dialog 212, balloon, or window that connects the claim and detailed description information (similar to the above format). As such, a major benefit to quickly assess the breadth of patent protection is provided (e.g., eliminating the need to flip back and forth between detailed description, claims, and drawings).

Figure 2C:
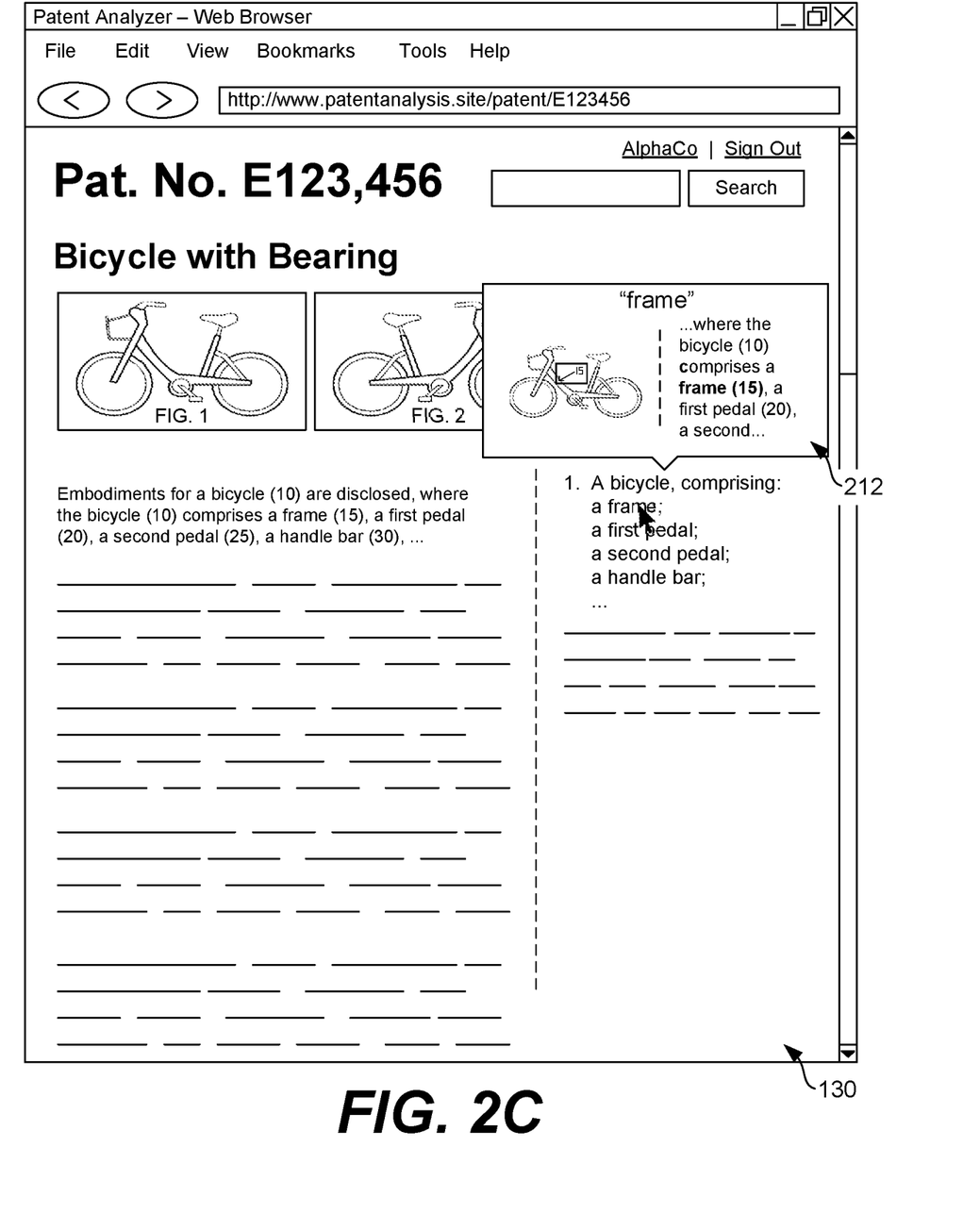

Moving on to FIG. 2C, shown is another non-limiting example of the user interface 169 that may be generated by the computing environment 103. FIG. 2C shows a user interaction with another claim term, such as "frame." The dialog 212 is shown in the user interface 169 that includes additional information corresponding to the selected or manipulated claim term (i.e., "frame"). For instance, the dialog 212 includes a portion of the detailed description that introduced the term "frame." Moreover, a drawing that includes a reference numeral corresponding to the claim term "frame" is included in the dialog 212.

Figure 2D:
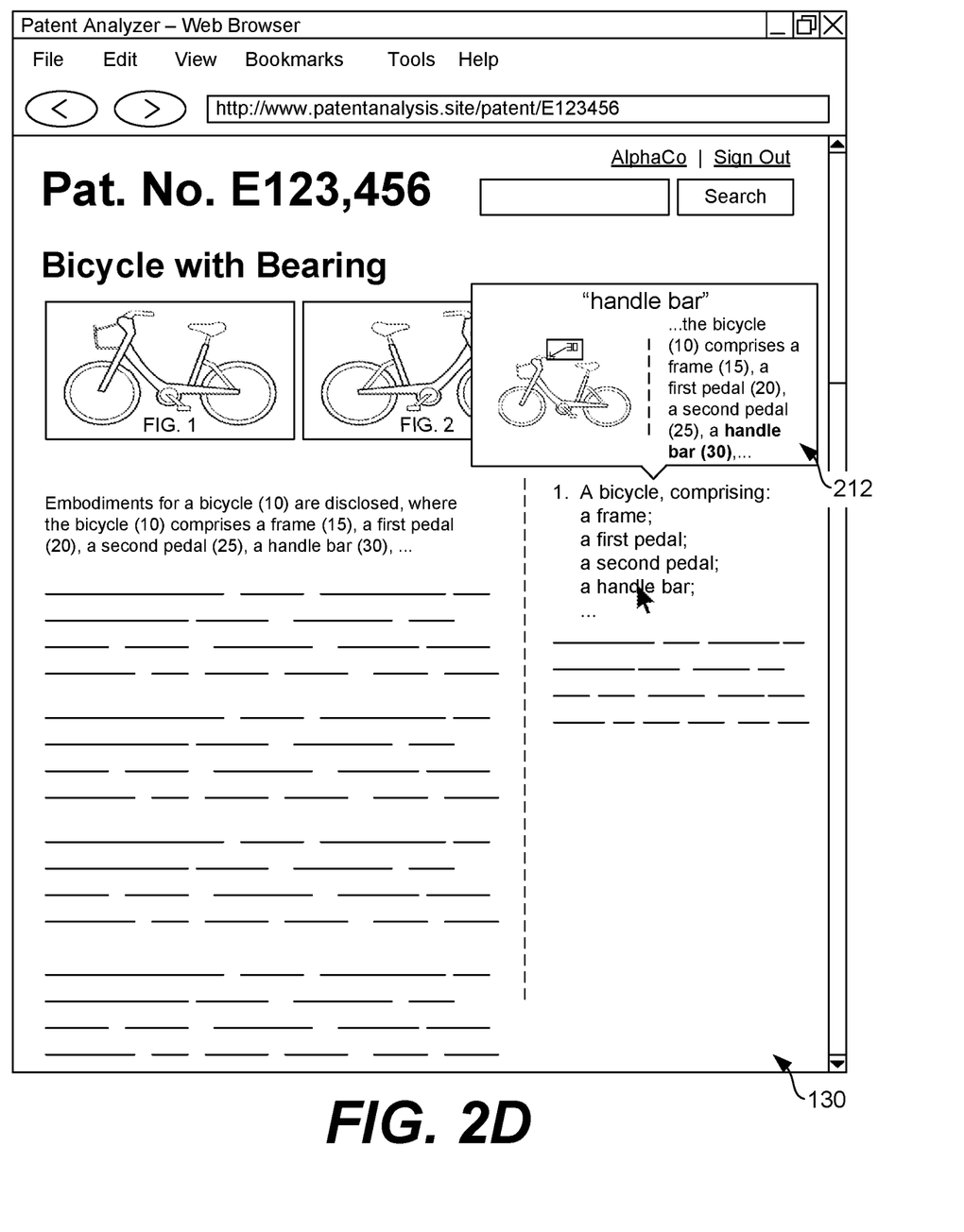
Figure 2E:
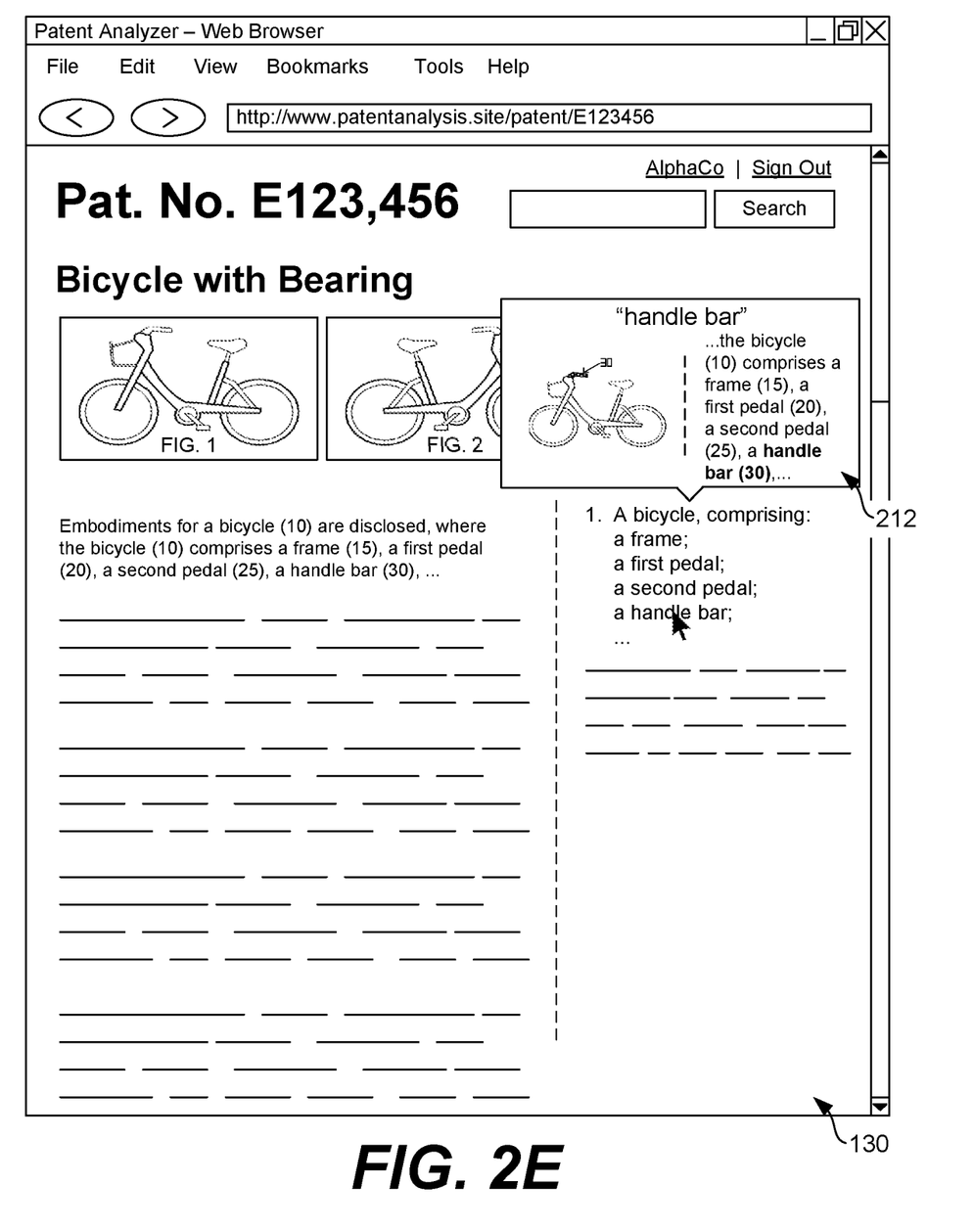

Turning now to FIG. 2D, shown is another non-limiting example of the user interface 169 that may be generated by the computing environment 103. FIG. 2D shows an example of a user interaction with another claim term, such as "handle bar." The dialog 212 is shown in the user interface 169 that includes additional information corresponding to the selected or manipulated claim term (i.e., "handle bar"). For instance, the dialog 212 includes a portion of the detailed description that introduced the term "handle bar" or defined the claim term "handle bar." Moreover, a drawing that includes a reference numeral corresponding to the claim term "handle bar" is shown in the dialog 212. While FIG. 2D shows the reference numeral for the term handle bar emphasized, in FIG. 2E, the portion of the drawing corresponding to the claim term "handle bar" is shown being filled in with a color. In further examples, when the claim term is selected or manipulated, all instances of the claim term in the detailed description can be emphasized (e.g., emphasized in bold or italics, highlighted, font color changed, etc.).

Figure 3:
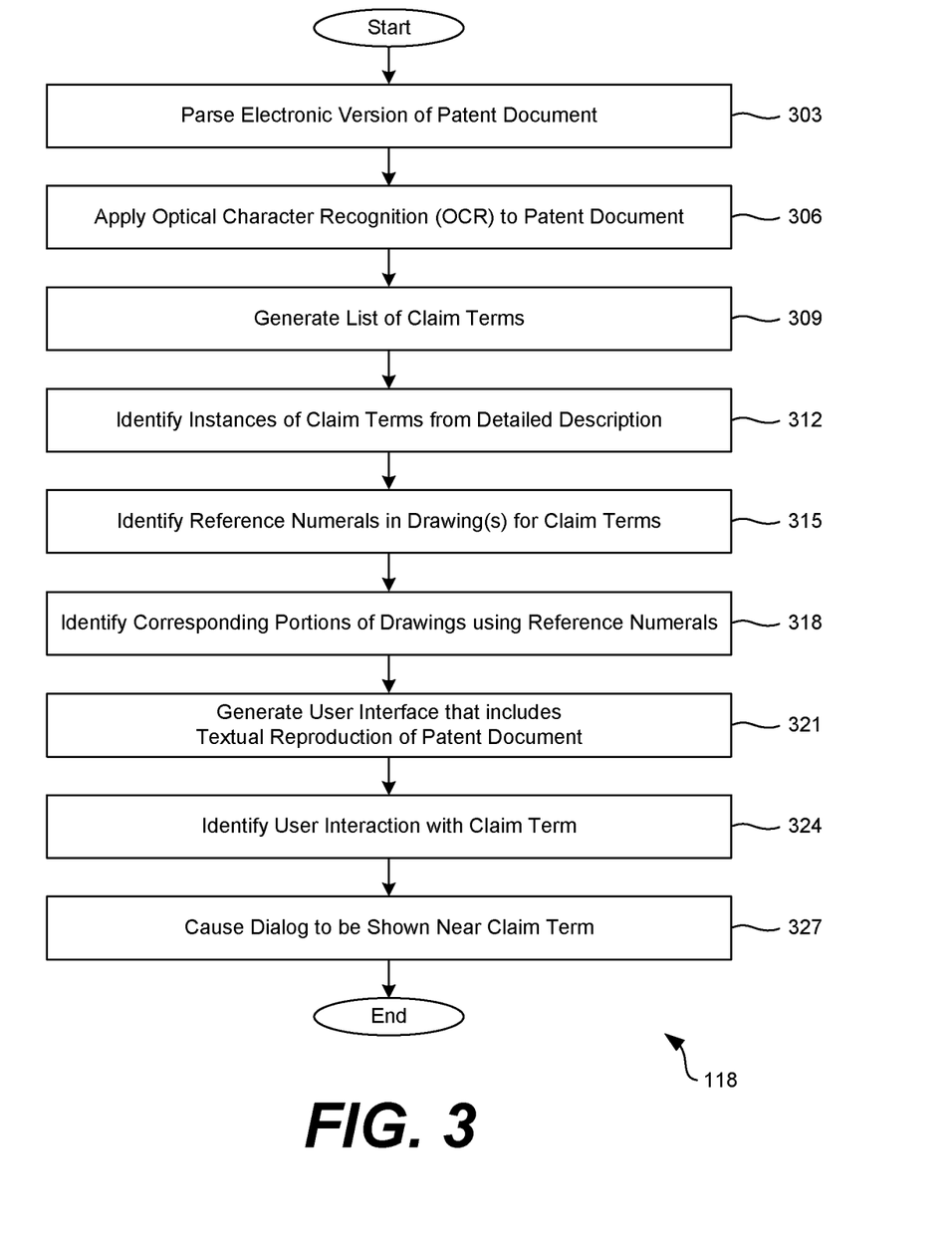
FIG. 3 is a flowchart illustrating one example of functionality implemented as portions of a patent processing application executed in a computing environment in the networked environment of FIG. 1 according to various embodiments of the present disclosure.

Referring next to FIG. 3, shown is a flowchart that provides one example of the operation of a portion of the patent analysis application 115 according to various embodiments. It is understood that the flowchart of FIG. 3 provides merely an example of the many different types of functional arrangements that may be employed to implement the operation of the portion of the patent analysis application 115 as described herein. As an alternative, the flowchart of FIG. 3 may be viewed as depicting an example of elements of a method implemented in the computing environment 103 according to one or more embodiments.

The computing environment 103 may parse an electronic version of a patent document comprising at least (a) a detailed description, (b) a claims section, and (c) at least one drawing (step 303). In various embodiments, parsing the electronic version of the patent document may include applying an optical character recognition process to the electronic document (step 306), generating a list of claim terms used in the claims section (step 309), identifying instances of the claim terms used in the detailed description (step 312), identifying at least one reference numeral corresponding to the claim terms from the detailed description (step 315), and identifying portions of the at least one drawing that comprises the at least one reference numeral (step 315).

Further, the computing environment 103 may generate at least one user interface 169 that comprises a textual reproduction of at least a portion of the claims section (step 321). The computing environment 103 may also identify a user interaction with a claim term in the portion of the claims section in the at least one user interface 169 (step 324). In response to the user interaction with the claim term, the computing environment 103 may cause a dialog to be presented proximate to the claim term, wherein the dialog comprises at least a portion of the detailed description that includes the claim term and/or the at least one drawing that comprises the at least one reference numeral corresponding to the claim term (step 327). The user interaction may include, for example, a hover-over event being performed in association with the claim term or a selection event being performed in association with the claim term. However, this is not limited to the claims section. For instance, the hover-over event may be performed to correlate a term in the Detailed Description to the Drawings, the Drawings to the Detailed Description, or other portions of a document.

In additional embodiments, the computing environment 103 may generate a three-dimensional model of an object corresponding to the claim term using the at least one drawing, where the at least one drawing comprises a two-dimensional black-and-white line drawing and or the use of AI to use the detailed description and or drawings to produce a 3D model of the image. This 3D model may allow the user to see the full 3D shape, rotate the parts, see an assembly view, exploded view or cross section of the part or parts. The three-dimensional model may be shown in the dialog of the at least one user interface 169 or used as an augmented feature in an augmented reality (AR) session. Further, in some embodiments, the at least one computing environment may, in response to the user interaction with the claim term, apply a color to a portion of the at least one drawing that corresponds to the claim term and/or apply a color to the instances of the claim term in the detailed description. This may also include using text in the detailed description (or other parts of the patent or patent application) to color in parts or provide a noticeable texture. For example, given a drawing having multiple parts, Part 1 can be modified from a black-and-white line drawing to show a stainless steel part, Part 2 being plastic, Part 3 being rubber, and so forth. The three-dimensional model or reconstruction of the two-dimensional images can be generated by the computing environment 103 to show each surface finish.

The computing environment 103 may include one or more computing devices. Each computing device may include at least one processor circuit, for example, having a processor and a memory, both of which are coupled to a local interface. To this end, each computing device may comprise, for example, at least one server computer or like device. The local interface may comprise, for example, a data bus with an accompanying address/control bus or other bus structure as can be appreciated.

Stored in the memory are both data and several components that are executable by the processor. In particular, stored in the memory and executable by the processor are the patent analysis application 115, the OCR engine 118, the semantics engine 121, and potentially other applications. Also stored in the memory may be a data store 112 and other data. In addition, an operating system may be stored in the memory and executable by the processor.

It is understood that there may be other applications that are stored in the memory and are executable by the processor as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory and are executable by the processor. In this respect, the term "executable" means a program file that is in a form that can ultimately be run by the processor. Examples of executable programs may be, for example, a compiled program that can be translated into machine code in a format that can be loaded into a random access portion of the memory and run by the processor, source code that may be expressed in proper format such as object code that is capable of being loaded into a random access portion of the memory and executed by the processor, or source code that may be interpreted by another executable program to generate instructions in a random access portion of the memory to be executed by the processor, etc. An executable program may be stored in any portion or component of the memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory is defined herein as including both volatile and nonvolatile memory and data storage components. Volatile components are those that do not retain data values upon loss of power. Nonvolatile components are those that retain data upon a loss of power. Thus, the memory may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor may represent multiple processors and/or multiple processor cores and the memory may represent multiple memories that operate in parallel processing circuits, respectively. In such a case, the local interface may be an appropriate network that facilitates communication between any two of the multiple processors, between any processor and any of the memories, or between any two of the memories, etc. The local interface may comprise additional systems designed to coordinate this communication, including, for example, performing load balancing. The processor may be of electrical or of some other available construction.

Although the applications, engines, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3 shows the functionality and operation of an implementation of portions of the patent analysis application 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIG. 3 shows a specific order of execution, it is understood that the order of execution may differ from that which is depicted. For example, the order of execution of two or more blocks may be scrambled relative to the order shown. Also, two or more blocks shown in succession in may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device comprising at least one hardware processor; and
   program instructions executable in the at least one computing device that, when executed, direct the at least one computing device to:
   parse an electronic version of a patent document comprising at least (a) a detailed description, (b) a claims section, and (c) at least one drawing by:
      identifying at least one reference numeral corresponding to claim terms from the claims section that are found in the detailed description; and
      identifying portions of the at least one drawing that comprise the at least one reference numeral;
   generate at least one user interface that comprises the at least one drawing and a textual reproduction of at least a portion of the patent document;
   identify a user interaction with a claim term within the textual reproduction of the at least a portion of the patent document in the at least one user interface; and
   in response to the user interaction with the claim term, cause a dialog to be presented proximate to the claim term, the dialog comprising a portion of the detailed description that includes the claim term and a three-dimensional model of an object corresponding to the claim term based at least in part on the at least one drawing.

2. The system of claim 1, wherein the electronic version of the patent document is parsed further by applying an optical character recognition (OCR) to the patent document.

3. The system of claim 1, wherein the at least one drawing comprises a two-dimensional black-and-white line drawing.

4. The system of claim 3, wherein the three-dimensional model is shown in the at least one user interface or used as an augmented feature in an augmented reality (AR) session.

5. The system of claim 1, further program instructions executable in the at least one computing device that, when executed, direct the at least one computing device to, in response to the user interaction with the claim term, apply a color to a portion of the at least one drawing that corresponds to the claim term.

6. The system of claim 1, further program instructions executable in the at least one computing device that, when executed, direct the at least one computing device to, in response to the user interaction with the claim term, apply a color to instances of the claim term in the detailed description.

7. The system of claim 1, wherein the user interaction comprises: a hover-over event being performed in association with the claim term or a selection event being performed in association with the claim term.

8. A computer-implemented method, comprising:
   parsing, by at least one computing device comprising at least one hardware processor, an electronic version of a patent document comprising at least (a) a detailed description, (b) a claims section, and (c) at least one drawing by:
      identifying at least one reference numeral corresponding to claim terms from the claims section that are found in the detailed description; and
      identifying portions of the at least one drawing that comprise the at least one reference numeral;
   generating, by the at least one computing device, at least one user interface that comprises the at least one drawing and a textual reproduction of at least a portion of the patent document;
   identifying, by the at least one computing device, a user interaction with a claim term within the textual reproduction of the at least a portion of the patent document in the at least one user interface; and
   in response to the user interaction with the claim term, causing, by the at least one computing device, a dialog to be presented proximate to the claim term, the dialog comprising a portion of the detailed description that includes the claim term and a three-dimensional model of an object corresponding to the claim term based at least in part on the at least one drawing.

9. The computer-implemented method of claim 8, wherein the electronic version of the patent document is parsed further by applying, by the at least one computing device, an optical character recognition (OCR) to the patent document.

10. The computer-implemented method of claim 8, wherein the at least one drawing comprises a two-dimensional black-and-white line drawing.

11. The computer-implemented method of claim 10, wherein the three-dimensional model is shown in the at least one user interface or used as an augmented feature in an augmented reality (AR) session.

12. The computer-implemented method of claim 8, further comprising applying, by the at least one computing device to, in response to the user interaction with the claim term, a color to a portion of the at least one drawing that corresponds to the claim term.

13. The computer-implemented method of claim 8, further comprising applying, by the at least one computing device, in response to the user interaction with the claim term, a color to instances of the claim term in the detailed description.

14. The computer-implemented method of claim 8, wherein the user interaction comprises: a hover-over event being performed in association with the claim term or a selection event being performed in association with the claim term.

15. A non-transitory, computer-readable medium comprising program instructions that, when executed by a processor of a computing device, cause the computing device to at least:
   parse an electronic version of a patent document comprising at least (a) a detailed description, (b) a claims section, and (c) at least one drawing by:
      identifying at least one reference numeral corresponding to claim terms from the claims section that are found in the detailed description; and
      identifying portions of the at least one drawing that comprise the at least one reference numeral;
   generate at least one user interface that comprises the at least one drawing and a textual reproduction of at least a portion of the patent document;
   identify a user interaction with a claim term within the textual reproduction of the at least a portion of the patent document in the at least one user interface; and
   in response to the user interaction with the claim term, cause a dialog to be presented proximate to the claim term, the dialog comprising a portion of the detailed description that includes the claim term and a three-dimensional model of an object corresponding to the claim term based at least in part on the at least one drawing.

16. The non-transitory, computer-readable medium of claim 15, wherein the program instructions, when executed by the processor, further cause the computing device to at least emphasize the at least one reference numeral as shown in the at least one user interface.

17. The non-transitory, computer-readable medium of claim 16, wherein the at least one reference numeral is emphasized by applying highlighting of the at least one reference numeral, adjusting a color of the at least one reference numeral, or applying a different background color to the at least one reference numeral.

18. The non-transitory, computer-readable medium of claim 15, wherein the program instructions, when executed by the processor, further cause the computing device to at least, in response to the user interaction with the at least one claim term, apply a color to a portion of the at least one drawing that corresponds to the at least one reference numeral.

19. The non-transitory, computer-readable medium of claim 15, wherein the program instructions, when executed by the processor, further cause the computing device to at least, in response to the user interaction with the at least one claim term, apply a color to instances of the claim term in the detailed description corresponding to the at least one reference numeral.

20. The non-transitory, computer-readable medium of claim 15, wherein the user interaction comprises: a hover-over event being performed in association with the claim term or a selection event being performed in association with the claim term.

* * * * *